US009152657B1

(12) United States Patent
Perkins et al.

(10) Patent No.: US 9,152,657 B1
(45) Date of Patent: Oct. 6, 2015

(54) INDEXING TO EXTRACT HOMOGENEOUS ARRAYS FROM HETEROGENEOUS ARRAYS

(71) Applicant: The MathWorks, Inc., Natick, MA (US)

(72) Inventors: Peter C. Perkins, Natick, MA (US); Joseph F. Hicklin, Upton, MA (US); Abigail S. Skofield, Bolton, MA (US)

(73) Assignee: The MathWorks, Inc., Natick, MA (US)

( * ) Notice: Subject to any disclaimer, the term of this patent is extended or adjusted under 35 U.S.C. 154(b) by 164 days.

(21) Appl. No.: 13/803,901

(22) Filed: Mar. 14, 2013

(51) Int. Cl.
*G06F 7/00* (2006.01)
*G06F 17/30* (2006.01)

(52) U.S. Cl.
CPC ................... *G06F 17/30292* (2013.01)

(58) Field of Classification Search
CPC ............ G06F 17/30336; G06F 17/30342; G06F 17/30292
USPC .................................................. 707/803
See application file for complete search history.

(56) References Cited

U.S. PATENT DOCUMENTS

| 6,067,542 A * | 5/2000 | Carino, Jr. ................ 707/4 |
| 7,334,003 B2 * | 2/2008 | Frame et al. ............... 707/203 |
| 8,069,178 B1 | 11/2011 | Black et al. |
| 8,260,791 B1 | 9/2012 | Black et al. |
| 8,812,947 B1 * | 8/2014 | Maoz et al. ............... 715/212 |
| 2007/0294276 A1 * | 12/2007 | Shen et al. ................ 707/102 |
| 2008/0208827 A1 * | 8/2008 | Adir et al. ................. 707/4 |
| 2012/0166402 A1 * | 6/2012 | Pederson et al. ........... 707/692 |

OTHER PUBLICATIONS

Wikipedia.com, Spreadsheet, https://web.archive.org/web/20080627173154/http://en.wikipedia.org/wiki/Spreadsheet, Jun. 27, 2008, 17 pp.*

* cited by examiner

*Primary Examiner* — Marc Somers
(74) *Attorney, Agent, or Firm* — Harrity & Harrity, LLP

(57) ABSTRACT

A device receives, in a technical computing environment (TCE), a heterogeneous array that includes columns and rows, and receives a command that references multiple columns and one or more rows of the heterogeneous array. The device determines, based on the command, that the referenced multiple columns of the heterogeneous array include a same data type. The device creates, based on the command and based on determining that the referenced multiple columns of the heterogeneous array include the same data type, a homogeneous array that includes the referenced multiple columns and the referenced one or more rows of the heterogeneous array. The device outputs the homogeneous array for further processing.

21 Claims, 17 Drawing Sheets

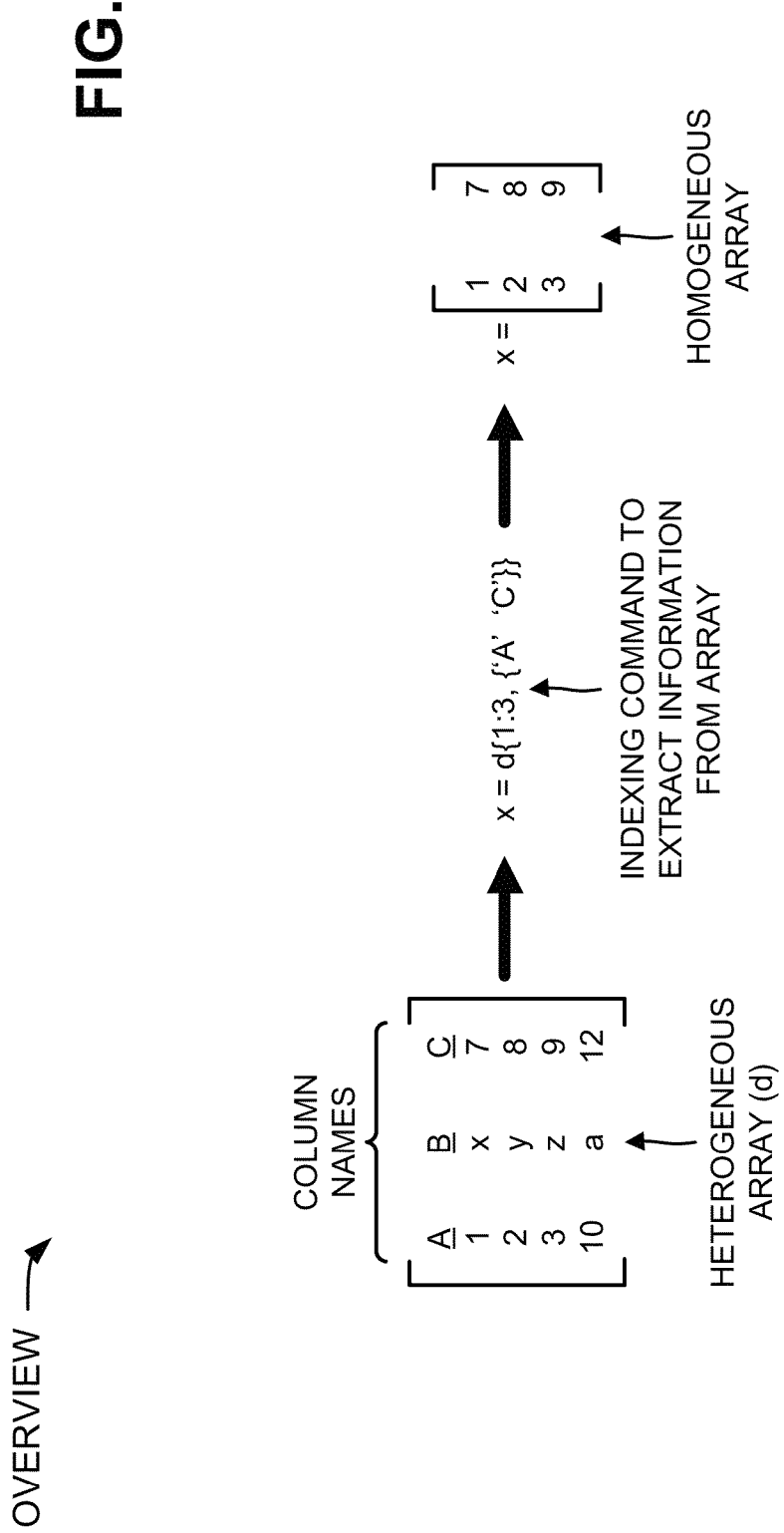

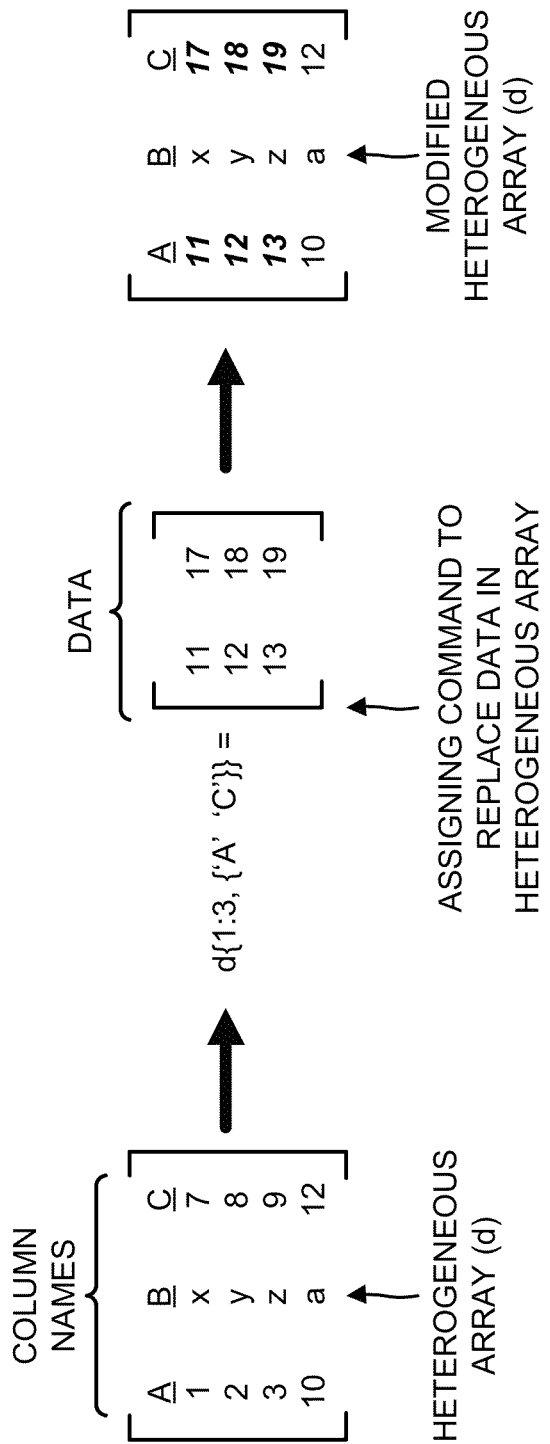

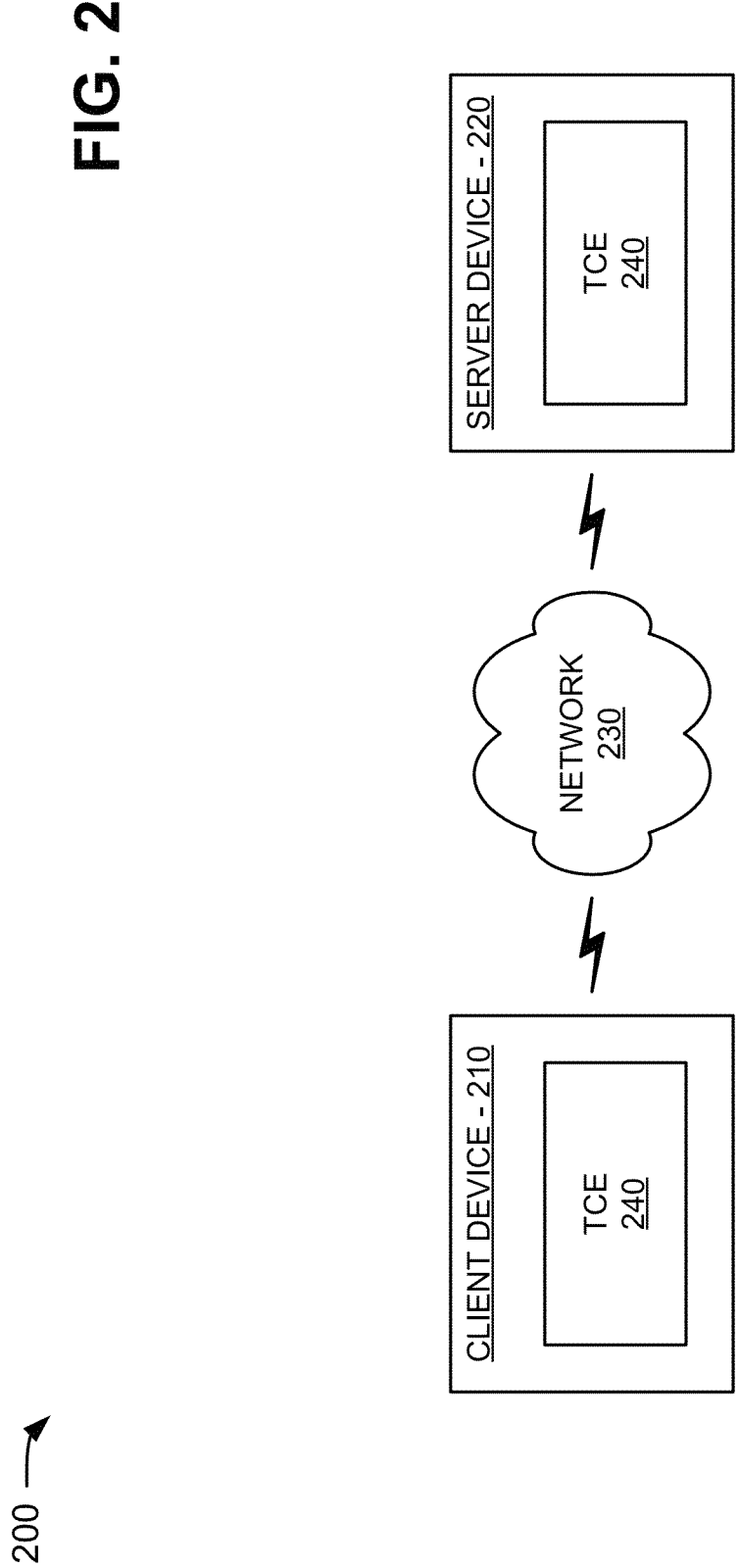

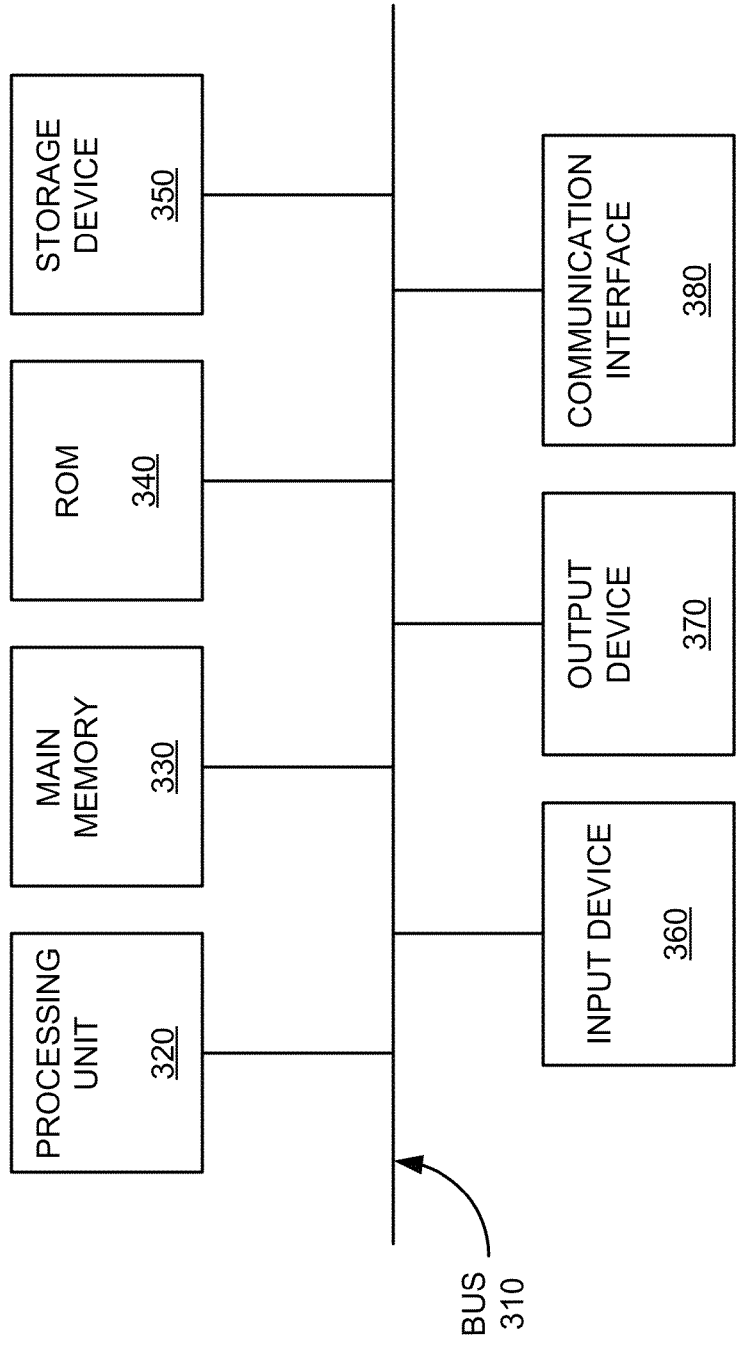

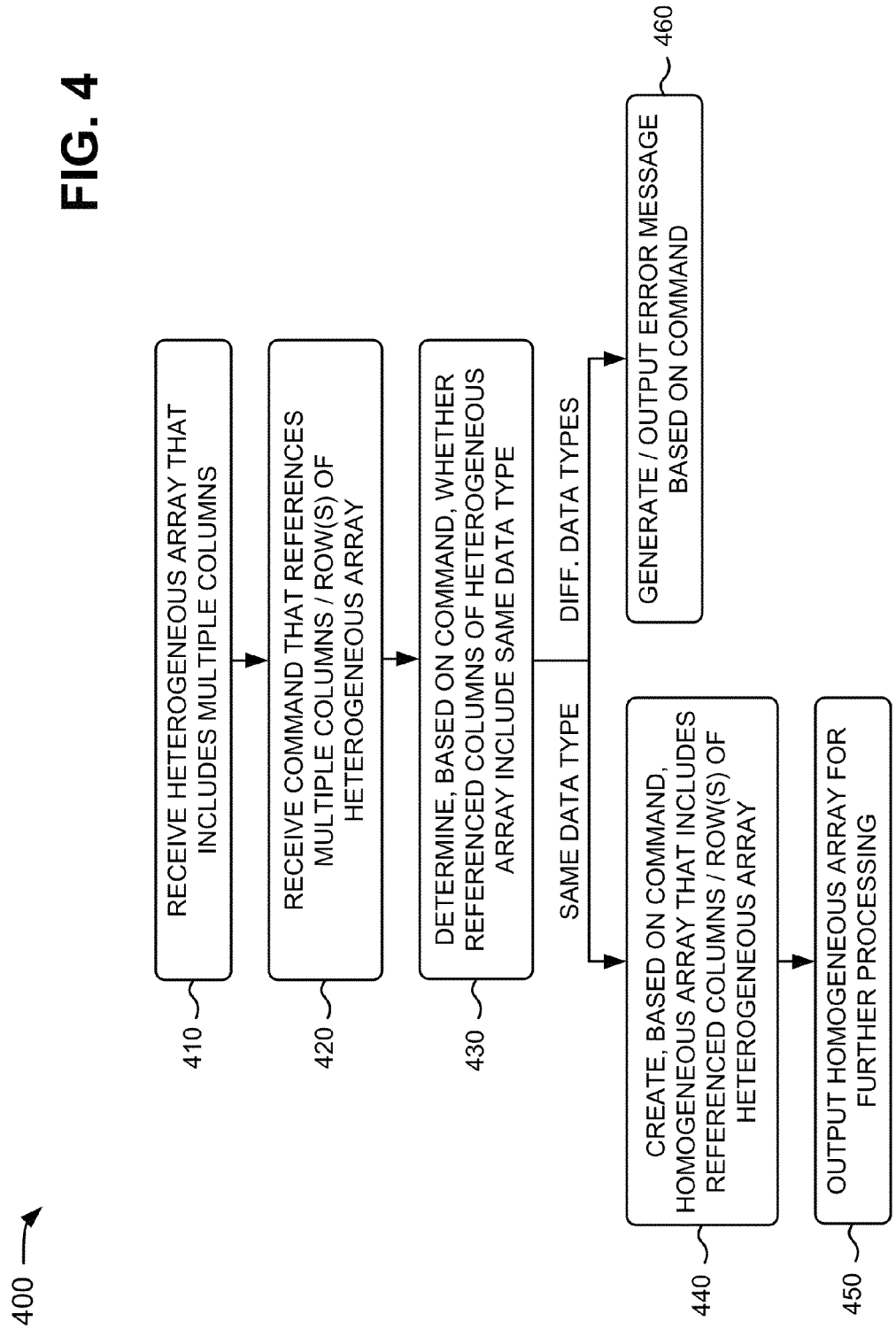

FIG. 5B

```
>> load hospital
>> h = hospital(1:5,1:4)
h =     LastName    Sex       Age   Weight
        Smith       Male      38    176
        Johnson     Male      43    163
        Williams    Female    38    131
        Jones       Female    40    133
        Brown       Female    49    119

>> y = h{3:5, {'Age' 'Weight'}}
```

HETEROGENEOUS ARRAY (h) (510)

INDEXING COMMAND (520)

```
>> load hospital
>> h = hospital(1:5,1:4)
h =
    LastName    Sex       Age   Weight
    Smith       Male      38    176
    Johnson     Male      43    163
    Williams    Female    38    131
    Jones       Female    40    133
    Brown       Female    49    119

>> y = h{3:5, {'Sex' 'Age'}}
```

HETEROGENEOUS ARRAY (h) (510)

INDEXING COMMAND (550)

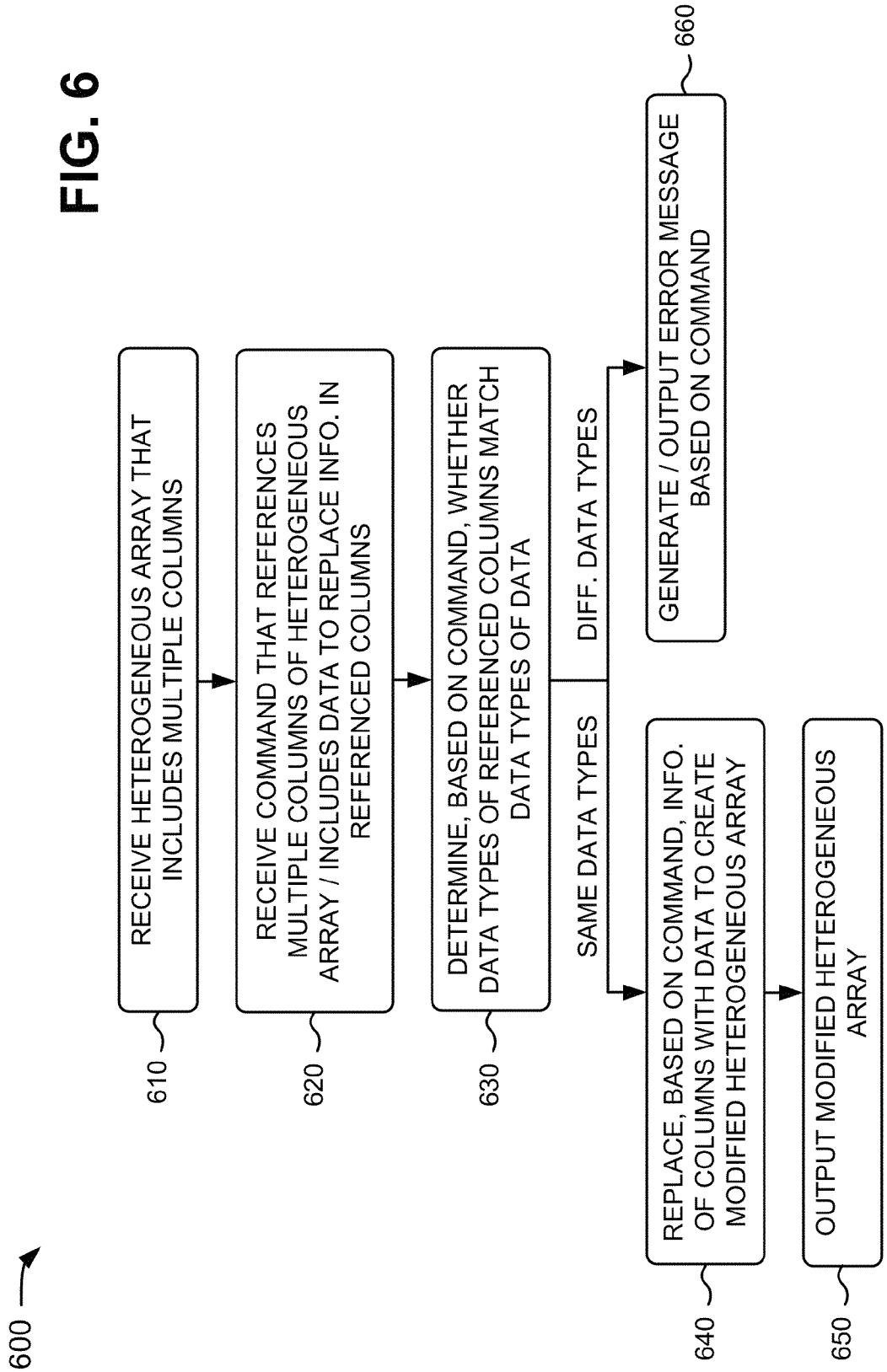

INDEXING TO EXTRACT HOMOGENEOUS ARRAYS FROM HETEROGENEOUS ARRAYS

BRIEF DESCRIPTION OF THE DRAWINGS

The accompanying drawings, which are incorporated in and constitute a part of this specification, illustrate one or more implementations and, together with the description, explain these implementations. In the drawings:

FIGS. 1A and 1B are diagrams of an overview of an example implementation described herein;

FIG. 2 is a diagram of an example environment in which systems and/or methods described herein may be implemented;

FIG. 3 is a diagram of example components of one or more of the devices of the environment depicted in FIG. 2;

FIG. 4 is a flow chart of an example process for using an indexing command to extract a homogeneous array from a heterogeneous array;

FIGS. 5A-5F are diagrams of an example of the process described above with respect to FIG. 4;

FIG. 6 is a flow chart of an example process for using an assigning command to assign information to a heterogeneous array.

DETAILED DESCRIPTION

Figure 5A:
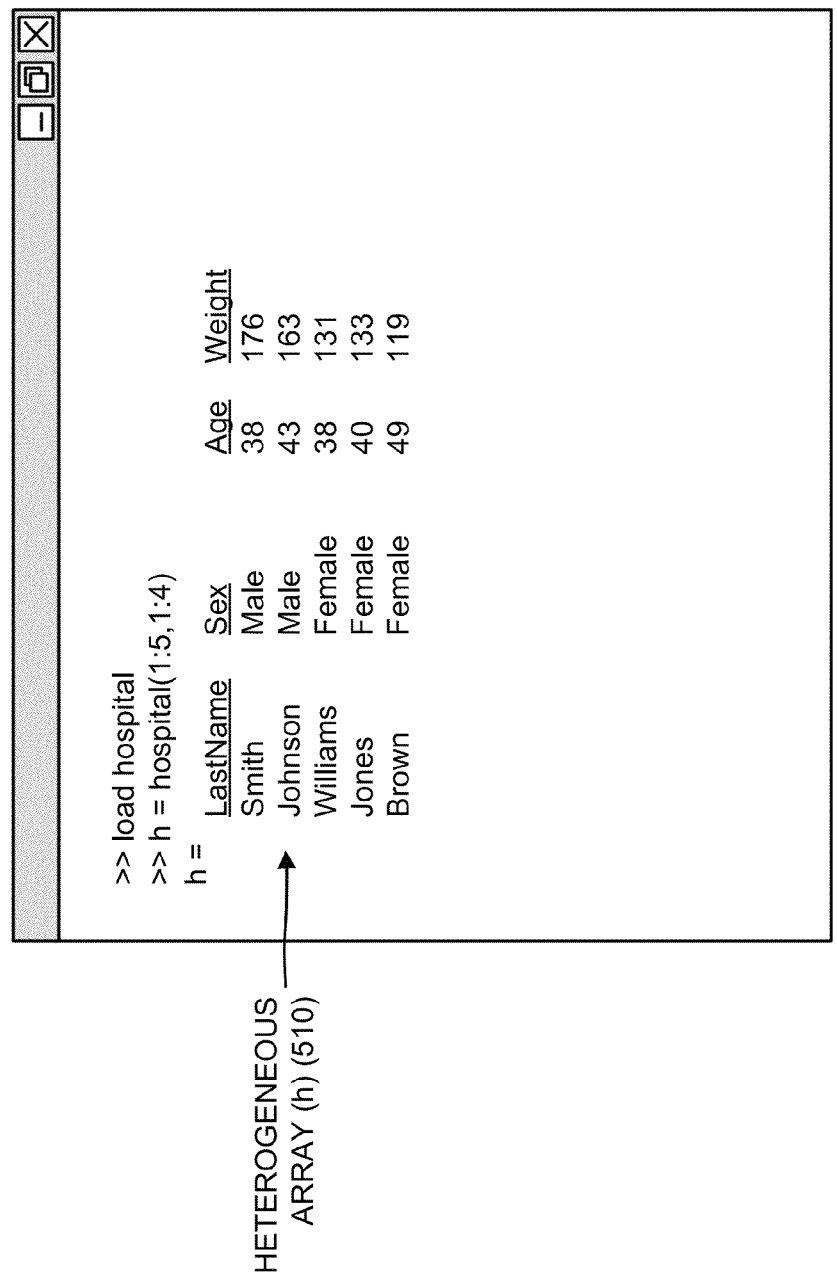

The following detailed description refers to the accompanying drawings. The same reference numbers in different drawings may identify the same or similar elements.

Indexing may refer to the act of extracting information from data containers, such as homogeneous arrays, heterogeneous arrays, etc. Every element of a homogeneous array may include the same data type (e.g., numbers, text, etc.), whereas at least one element of a heterogeneous array may include a different data type than at least one other element of the heterogeneous array. In one particular heterogeneous array (e.g., a dataset array), elements of each column must have the same data type but different columns may have different data types. In some cases, a heterogeneous array may include homogeneous data.

Overview

Systems and/or methods described herein may provide an indexing command to extract homogeneous information from heterogeneous arrays, such as dataset arrays, and an assigning command to replace homogeneous information provided in the heterogeneous arrays. The homogeneous information may include multiple values (e.g., numeric data, non-numeric data, etc.) with the same data type or that can be converted to the same data type.

FIGS. 1A and 1B are diagrams of an overview of an example implementation described herein. For the overview, assume that a device (not shown in FIGS. 1A and 1B) receives a heterogeneous array (d) that takes the form of a dataset array. The heterogeneous array may include an array with three columns (named A, B, and C) and four rows. The column names of the heterogeneous array may not be considered a row of the heterogeneous array. The columns of the heterogeneous array may include different data types based on the information provided in the columns. For example, column A may be a numeric data type, column B may be a textual data type, and column C may be a numeric data type. Thus, columns A and C may have the same data type (i.e., a numeric data type).

As further shown in FIG. 1A, the device may receive an indexing command, such as x=d{1:3, {'A''C'}}. In some implementations, the indexing command may include additional characters, different characters, or differently arranged characters. The indexing command may be utilized by the device to extract information from the heterogeneous array. For example, the indexing command shown in FIG. 1A may seek to extract rows "1" to "3" (e.g., "1:3") of columns A and C from the heterogeneous array. The indexing command may cause the device to extract rows "1" to "3" of columns A and C from the heterogeneous array, and to output a result as a homogeneous array (x). The result may be a homogeneous array since the information extracted from the heterogeneous array has the same numeric data type.

As shown in FIG. 1B, the device may also receive an assigning command, such as:

$$d\{1:3, \{'A' \; 'C'\}\} = \begin{bmatrix} 11 & 17 \\ 12 & 18 \\ 13 & 19 \end{bmatrix}.$$

In some implementations, the assigning command may include additional characters, different characters, or differently arranged characters. The assigning command may be utilized by the device to replace information in the heterogeneous array with data provided in the assigning command. For example, the assigning command shown in FIG. 1B may seek to replace the information in rows "1" to "3" of columns A and C of the heterogeneous array with the data of the assigning command. The assigning command may cause the device to replace rows "1" to "3" of columns A and C of the heterogeneous array with the data, and to output a result as a modified heterogeneous array.

Such an arrangement may provide simple and convenient commands to extract and/or assign homogeneous information from/to heterogeneous arrays. The commands may make writing code more intuitive and less time consuming for a user (e.g., a programmer, a software developer, etc.), which may enable the user to accomplish tasks more quickly and efficiently. The commands may make heterogeneous arrays useful to more people. For example, heterogeneous arrays may not support mathematical operations and may suffer from poor performance for some operations. However, with the commands, a user may store numeric data in a heterogeneous array, extract data as needed to perform fast mathematical operations, and restore the transformed numeric data into the heterogeneous array.

The terms code and program code, as used herein, are to be used interchangeably and are to be broadly interpreted to include text-based code that may require further processing to execute (e.g., C++ code, Hardware Description Language (HDL) code, very-high-speed integrated circuits (VHSIC) HDL (VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

User interfaces, as described herein, may include graphical user interfaces (GUIs) or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a technical computing environment (TCE) (e.g., via a touch screen display, a mouse, a keyboard, a keypad, voice commands, etc.).

Example Environment Arrangement

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices. In some implementations, client device 210 may include a TCE 240, described below.

Server device 220 may include one or more server devices, or other types of computation and communication devices. Server device 220 may include a device that is capable of communicating with client device 210 (e.g., via network 230). In some implementations, server device 220 may include one or more laptop computers, personal computers, workstation computers, servers, central processing units (CPUs), graphical processing units (GPUs), application-specific integrated circuits (ASICs), field-programmable gate arrays (FPGAs), etc. In some implementations, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

As indicated above, TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 240 may include a dynamically-typed programming language (e.g., the M language, a MATLAB® language, a MATLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In some implementations, TCE 240 may provide these functions and/or tools using toolboxes (e.g., toolboxes for signal processing, image processing, data plotting, parallel processing, etc.). In some implementations, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 240. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

Example Device Architecture

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

Example Process for Extracting a Homogeneous Array from a Heterogeneous Array

FIG. 4 is a flow chart of an example process 400 for using an indexing command to extract a homogeneous array from a heterogeneous array. In some implementations, process 400 may be performed by client device 210 (e.g., TCE 240). In some implementations, process 400 may be performed by another device or a group of devices (e.g., server device 220) separate from or including client device 210.

As shown in FIG. 4, process 400 may include receiving a heterogeneous array that includes multiple columns (block 410). For example, client device 210/TCE 240 may receive a heterogeneous array that includes multiple columns and one or more rows. In some implementations, client device 210/TCE 240 may receive the heterogeneous array from server device 220, may retrieve the heterogeneous array from memory (e.g., main memory 330, FIG. 3), may receive the heterogeneous array from a user of client device 210/TCE 240 (e.g., via user inputs), etc.

The heterogeneous array may include an array of multiple columns and one or more rows that include elements (e.g., text, numbers, etc.). The columns of the heterogeneous array may include different data types based on the elements provided in the rows associated with the columns. For example, one or more columns of the heterogeneous array may include textual data types, while other columns of the heterogeneous array may include numeric data types. In some implementations, the heterogeneous array may be inverted and the rows of heterogeneous array may include different data types based on the elements provided in the columns associated with the rows. The user may instruct client device 210 to load the heterogeneous array into TCE 240 using a command (e.g., a 'load' command), and client device 210 may load the heterogeneous array into TCE 240 based on the command.

As further shown in FIG. 4, process 400 may include receiving a command that references multiple columns and row(s) of the heterogeneous array (block 420). For example, client device 210/TCE 240 may receive an indexing command. In some implementations, client device 210/TCE 240 may receive the indexing command from a user of client device 210/TCE 240 (e.g., via user inputs), etc. The indexing command may include syntax of a general form:

$h\{R_1:R_2, \{C_1 \ldots C_N\}\}$ where h may correspond to the heterogeneous array, $R_1$ may correspond to a row (e.g., a name, a number, etc.) of the heterogeneous array, $R_2$ may correspond to another row of the heterogeneous array, $C_1$ may correspond to a column (e.g., a name, a number, etc.) of the heterogeneous array, and $C_N$ may correspond to another column of the heterogeneous array. If no row or column is specified in the indexing command, this may indicated that the entire row or column is referenced.

Braces ("{ }") may be utilized to indicate that information is to be extracted from the heterogeneous array. A colon (:) may be provided between the rows $R_1$ and $R_2$ to indicate that all consecutive rows are to be extracted from the heterogeneous array, and a comma (,) may be provided between the rows $R_1$ and $R_2$ to indicate that specific rows are to be extracted from the heterogeneous array. For example, "1:3" may indicate that rows "1" through "3" are to be extracted from the heterogeneous array, and "[1,3]" may indicate that rows "1" and "3" are to be extracted from the heterogeneous array. A colon (:) may be provided between the columns $C_1$ and $C_N$ to indicate that consecutive columns are to be extracted from the heterogeneous array, and a space may be provided between the columns $C_1$ and $C_N$ to indicate that specific columns are to be extracted from the heterogeneous array. For example, "A:C" may indicate that columns "A" through "C" are to be extracted from the heterogeneous array, and "A C" may indicate that columns "A" and "C" are to be extracted from the heterogeneous array.

In some implementations, the indexing command may include additional characters, different characters, or differently arranged characters. For example, the indexing command may include a number, a vector of numbers, a string, an array of strings, etc. In some implementations, the user of client device 210/TCE 240 may specify a different syntax for the indexing command. For example, the user may specify the indexing command by the general form: $h\{R_1, R_2, C_1, C_N\}\}$.

The indexing command may be utilized by client device 210/TCE 240 to extract information from the heterogeneous array. The indexing command may be used by client device 210/TCE 240 to extract information from the heterogeneous array by referencing multiple columns and one or more rows of the heterogeneous array. For example, the indexing command may reference one or more rows (e.g., "1:4") of two or more columns from the heterogeneous array.

As further shown in FIG. 4, process 400 may include determining, based on the command, whether the referenced columns of the heterogeneous array include the same data type (block 430). For example, client device 210/TCE 240 may determine, based on the indexing command, whether the referenced columns of the heterogeneous array include the same data type. Client device 210/TCE 240 may make this determination by analyzing elements provided in each of the referenced columns to determine data types for each of the referenced columns. Client device 210/TCE 240 may compare the determined data types to determine whether the data types match. If the determined data types match, client device 210/TCE 240 may determine that the referenced columns of the heterogeneous array include the same data type. If the determined data types do not match, client device 210/TCE 240 may determine that the referenced columns of the heterogeneous array do not include the same data type.

Returning to FIG. 4, if the referenced columns of the heterogeneous array include the same data type (block 430— SAME DATA TYPE), process 400 may include creating, based on the command, a homogeneous array that includes the referenced columns and row(s) of the heterogeneous array (block 440). For example, if the determined data types match, client device 210/TCE 240 may determine that the referenced columns of the heterogeneous array include the same data type. Based on this determination, the indexing command may cause client device 210/TCE 240 to extract the referenced columns and rows from the heterogeneous array. Client device 210/TCE 240 may create a homogeneous array based on the information extracted from the heterogeneous array. The homogeneous array may include homogeneous information since the information extracted from the heterogeneous array has the same data type.

In some implementations, the indexing command may cause client device 210/TCE 240 to extract the referenced columns from the heterogeneous array. The indexing command may cause client device 210/TCE 240 to combine the extracted columns to generate a temporary homogeneous array. The temporary homogeneous array may include all of the elements of the extracted columns. The indexing command may cause client device 210/TCE 240 to remove rows unreferenced by the indexing command from the temporary homogeneous array. Removal of the unreferenced rows from the temporary homogeneous array may generate the homogeneous array. In some implementations, the homogeneous array may include numbers, strings, other data types, etc. In some implementations, client device 210/TCE 240 may create the homogeneous array in other ways.

As further shown in FIG. 4, process 400 may include outputting the homogeneous array for further processing (block 450). For example, client device 210/TCE 240 may output the homogeneous array for further processing by the user. In some implementations, client device 210/TCE 240 may provide homogeneous array 530 for display to the user and/or may store the homogeneous array in memory (e.g., main memory 330, FIG. 3). In some implementations, the user, via client device 210/TCE 240, may perform additional operations on the homogeneous array. For example, assume that the heterogeneous array stores numeric data in multiple columns. The user, via client device 210/TCE 240, may extract the homogeneous array from such a heterogeneous array, and may perform fast mathematical operations on the homogeneous array (e.g., which may not be performed on the heterogeneous array). The user, via client device 210/TCE 240, may restore the transformed numeric data to the heterogeneous array.

Returning to FIG. 4, if the referenced columns of the heterogeneous array do not include the same data type (block 430—DIFF. DATA TYPES), process 400 may include generating and/or outputting an error message based on the command (block 460). For example, client device 210/TCE 240 may analyze the heterogeneous array, based on the indexing command, and determine that the referenced columns of the heterogeneous array do not include the same data type. Since the referenced columns of the heterogeneous array include different data types, client device 210/TCE 240 may be unable to combine the referenced information into a homogeneous array. Thus, client device 210/TCE 240 may generate an error message that may be displayed to the user. In some implementations, the error message may indicate that it is impossible to combine data from the referenced columns into a single homogeneous array since the referenced columns have different data types. In some implementations, "int32" and "int16" may include different data types, but may be extracted as a homogeneous array, without an error message, since "int16" may be cast into "int32."

In some implementations, client device 210/TCE 240 may provide a suggestion, to the user, to facilitate extracting a homogeneous array from the heterogeneous array. For example, client device 210/TCE 240 may identify the data type of each column of the heterogeneous array, referenced by the indexing command. Assume that the indexing command references three columns and the data type of one of the three columns does not match the data type of the other two columns. In this situation, client device 210/TCE 240 may identify other columns, of the heterogeneous array, that are of the same data type as the two columns referenced by the indexing command. Client device 210/TCE 240 may provide a user interface, to the user, which allows the user to select one of the other identified columns, of the heterogeneous array, of the same data type, to replace the one column, referenced by the indexing command, of the different data type.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Example Utilization of a Heterogeneous Array and an Indexing Command

FIGS. 5A-5F are diagrams of an example 500 of the process described above with respect to FIG. 4. In example 500, assume that client device 210/TCE 240 receives a heterogeneous array (h) 510 that includes multiple columns. The user may instruct client device 210 to load heterogeneous array 510 into TCE 240 using a command (e.g., a 'load' command), and client device 210 may load heterogeneous array 510 into TCE 240 based on the command. As shown in FIG. 5A, client device 210/TCE 240 may provide heterogeneous array 510 for display to the user, based on the command.

In example 500, assume further that heterogeneous array 510 includes an array of four columns (e.g., labeled 'LastName,' 'Sex,' 'Age,' and 'Weight') and five rows (e.g., "1:5"). The column names of heterogeneous array 510 may not be considered a row of heterogeneous array 510. The columns of heterogeneous array 510 may include different data types based on the elements provided in the columns. For example, the 'LastName' column may be a textual data type, the 'Sex' column may be a textual data type, the 'Age' column may be a numeric data type, and the 'Weight' column may be a numeric data type. Thus, the 'LastName' and 'Sex' columns may have the same data type (i.e., a textual data type), and the 'Age' and 'Weight' columns may have the same data type (i.e., a numeric data type).

As shown in FIG. 5B, assume that client device 210/TCE 240 receives an indexing command 520 from the user of client device 210/TCE 240. For example, assume that the user enters the command via a command line. Indexing command 520 may include syntax, such as, for example, y=h{3:5, {'Age''Weight'}}. Indexing command 520 may be utilised by client device 210/TCE 240 to extract information from heterogeneous array 510. For example, assume that the user wishes to extract the ages and weights of three people listed in heterogeneous array 510 so that the user may calculate the average ages and weights of the three people. Indexing command 520 may attempt to extract information from heterogeneous array 510 by referencing multiple columns and one or more rows of heterogeneous array 510. For example, indexing command 520 may reference rows "3" to "5" (e.g., "3:5") of the 'Age' and 'Weight' columns from heterogeneous array 510.

Client device 210/TCE 240 may determine, based on indexing command 520, whether the referenced columns of heterogeneous array 510 include the same data type. Client device 210/TCE 240 may analyze elements provided in the 'Age' and 'Weight' columns of heterogeneous array 510 to determine data types of the 'Age' and 'Weight' columns. Client device 210/TCE 240 may compare the determined data types to determine whether the data types match. In example 500, the determined data types of the 'Age' and 'Weight' columns are the same (i.e., numeric data types).

Figure 5C:
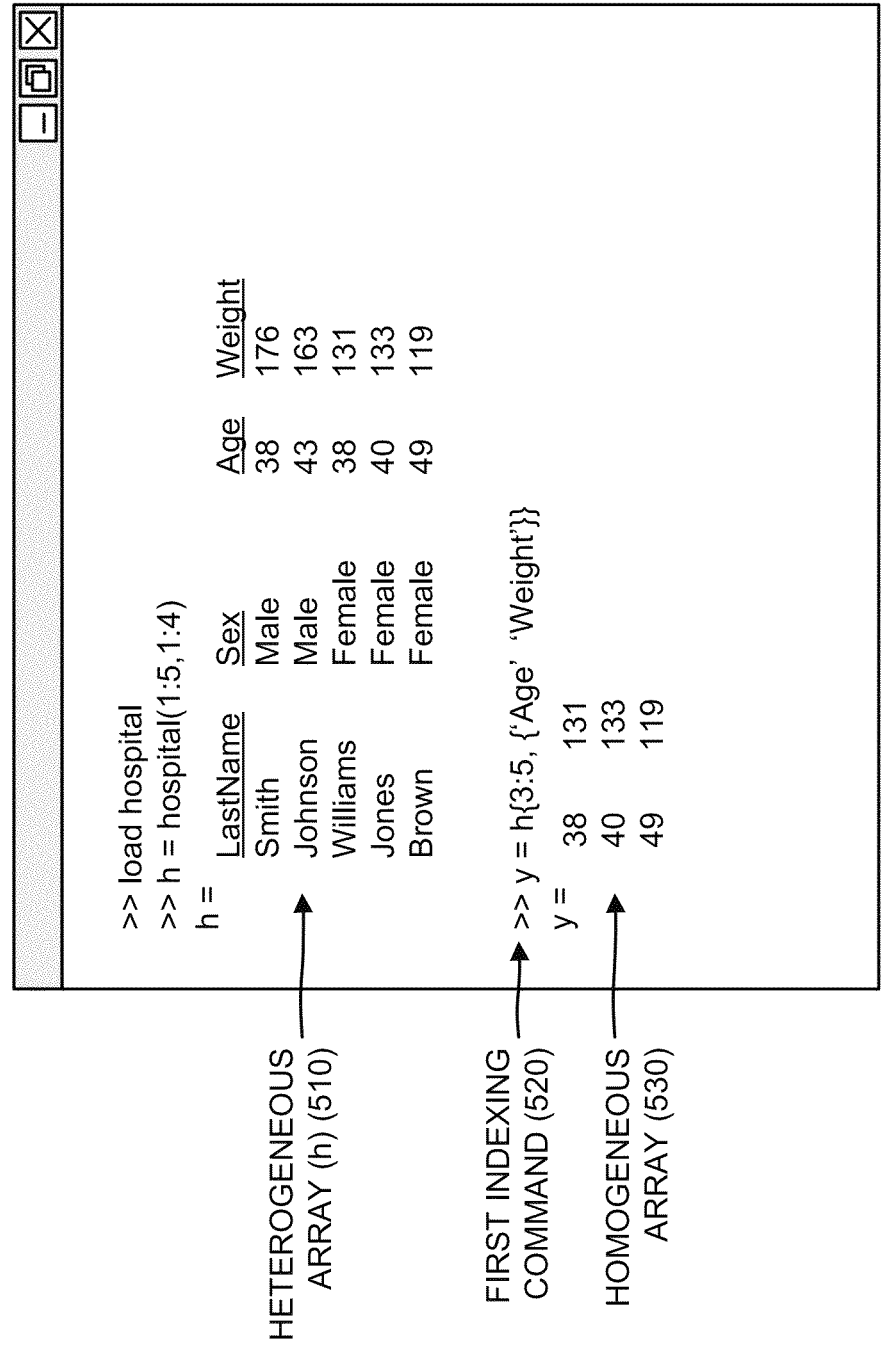

Since the determined data types match, indexing command 520 may cause client device 210/TCE 240 to extract rows "3" to "5" of columns 'Age' and 'Weight' from heterogeneous array 510. Client device 210/TCE 240 may create a homogeneous array (y) 530 based on the information extracted from heterogeneous array 510. Homogeneous array 530 may include homogeneous information since the information extracted from heterogeneous array 510 has the same numeric data type. As shown in FIG. 5C, client device 210/TCE 240 may provide homogeneous array 530 for display to the user. In some implementations, client device 210 may store homogeneous array 530 in memory (e.g., main memory 330, FIG. 3).

Figure 5D:
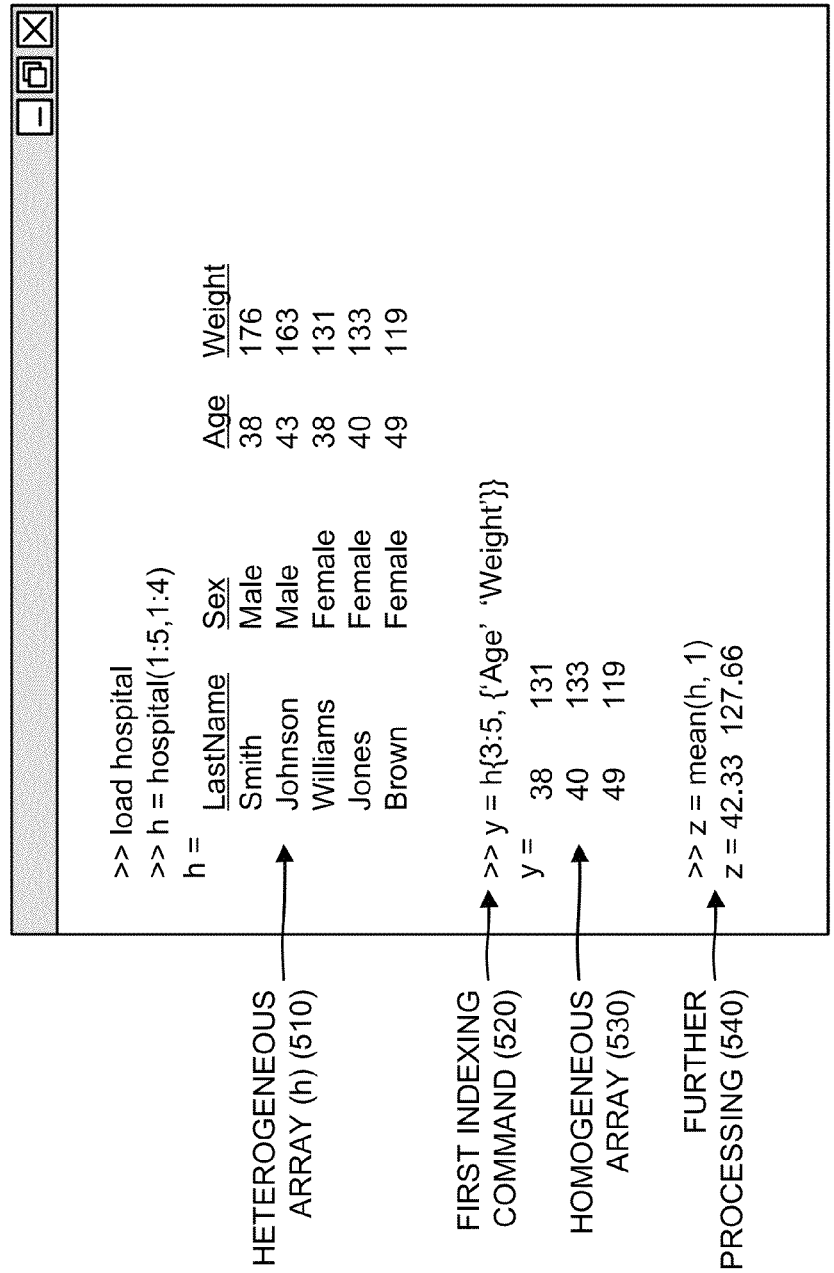

As shown in FIG. 5D, the user of client device 210/TCE 240 may perform further processing 540 on homogeneous array 530. For example, the user may wish to calculate the average age and weight for the elements provided in homogeneous array 530. As further shown in FIG. 5D, the user may provide a command (e.g., z=mean(h, 1)) to client device 210/TCE 240, and client device 210/TCE 240 may calculate the average age and weight based on the command. For example, client device 210/TCE 240 may determine that the average age is "42.33" and that the average weight is "127.66," and may provide this information for display to the user, as further indicated by reference number 540.

As shown in FIG. 5E, assume that the user inputs an indexing command 550 instead of indexing command 520 (FIG. 5B). Indexing command 550 may reference columns of heterogeneous array 510 that have different data types. For example, indexing command 550 may reference the 'Sex' column (e.g., a textual data type) and the 'Age' column (e.g., a numeric data type) of heterogeneous array 510. Thus, client device 210/TCE 240 may determine that the data types of the 'Sex' column and the 'Age' column are different.

Figure 5F:
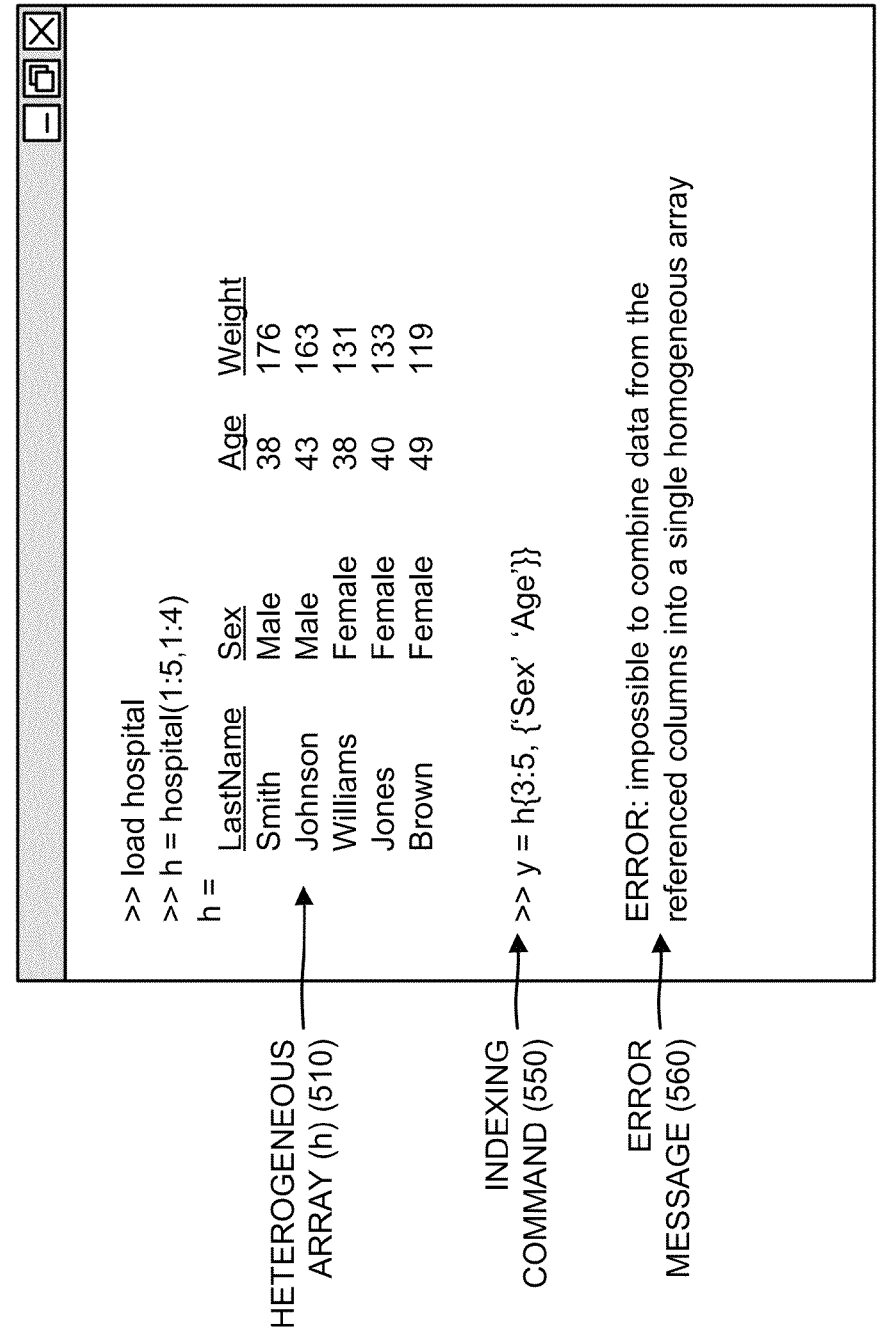

Since the referenced 'Sex' column and 'Age' column of heterogeneous array 510 include different data types, client device 210/TCE 240 may be unable to combine the referenced information into a homogeneous array. Thus, client device 210/TCE 240 may generate an error message 560 that may be displayed to the user, as shown in FIG. 5F. In some implementations, error message 560 may indicate that it is impossible to combine data from the referenced columns into a single homogeneous array since the referenced columns have different data types.

In some implementations, client device 210/TCE 240 may display a suggestion to the user when error message 560 is generated. For example, client device 210/TCE 240 may suggest replacing the 'Sex' column of heterogeneous array 510 with the 'Weight' column of heterogeneous array 510 since the 'Weight' column has a numeric data type like the 'Age' column.

Example Process for Assigning Information to a Heterogeneous Array

FIG. 6 is a flow chart of an example process 600 for using an assigning command to assign information to a heterogeneous array. In some implementations, process 600 may be performed by client device 210/TCE 240. In some implementations, process 600 may be performed by another device or a group of devices (e.g., server device 220) separate from or including client device 210.

As shown in FIG. 6, process 600 may include receiving a heterogeneous array that includes multiple columns (block 610). For example, client device 210/TCE 240 may receive a heterogeneous array that includes multiple columns and one or more rows. In some implementations, client device 210/TCE 240 may receive the heterogeneous array from server device 220, may retrieve the heterogeneous array from memory (e.g., main memory 330, FIG. 3), may receive the heterogeneous array from a user of client device 210/TCE 240 (e.g., via user inputs), etc. The heterogeneous array may include the features of the heterogeneous array described above in connection with FIG. 4. The user may instruct client device 210 to load the heterogeneous array into TCE 240 using a command (e.g., a 'load' command), and client device 210 may load the heterogeneous array into TCE 240 based on the command.

As further shown in FIG. 6, process 600 may include receiving a command that references multiple columns of the heterogeneous array and includes data to replace information in the referenced multiple columns of the heterogeneous array (block 620). For example, client device 210/TCE 240 may receive an assigning command. In some implementations, client device 210/TCE 240 may receive the assigning command from the user of client device 210/TCE 240 (e.g., via user inputs), etc. The assigning command may include syntax of a general form:

$h\{R_1:R_2, \{C_1 \ldots C_N\}\}$=data, where h may correspond to the heterogeneous array, $R_1$ may correspond to a row of the heterogeneous array, $R_2$ may correspond to another row of the heterogeneous array, $C_1$ may correspond to a column of the heterogeneous array, $C_N$ may correspond to another column of the heterogeneous array, and data may correspond to the data that is to replace information in the heterogeneous array. If no row or column is specified in the indexing command, this may indicated that the entire row or column is referenced.

Braces ("{ }") may be utilized to indicate that information is to be replaced in the heterogeneous array by the data. A colon (:) may be provided between the rows $R_1$ and $R_2$ to indicate that consecutive rows are to be replaced in the heterogeneous array, and a comma (,) may be provided between the rows $R_1$ and $R_2$ to indicate that specific rows are to be replaced in the heterogeneous array. For example, "1:5" may indicate that rows "1" through "5" are to be replaced in the heterogeneous array, and "[1,5]" may indicate that rows "1" and "5" are to be replaced in the heterogeneous array. A colon (:) may be provided between the columns $C_1$ and $C_N$ to indicate that consecutive columns are to be replaced in the heterogeneous array, and a space may be provided between the columns $C_1$ and $C_N$ to indicate that specific columns are to be replaced in the heterogeneous array. For example, "A:C" may indicate that columns "A" through "C" are to be replaced in the heterogeneous array, and "A C" may indicate that columns "A" and "C" are to be replaced in the heterogeneous array.

In some implementations, the assigning command may include additional characters, different characters, or differently arranged characters. For example, the assigning command may include a number, a vector of numbers, a string, an array of strings, etc. In some implementations, the user of client device 210/TCE 240 may specify a different syntax for the assigning command. For example, the user may specify the assigning command by the general form: $h\{R_1, R_2, C_1, C_N\}\}$=data.

The assigning command may be utilized by client device 210/TCE 240 to replace information (e.g., data) in the heterogeneous array. The assigning command may cause client device 210/TCE 240 to replace information in the heterogeneous array by referencing multiple columns of the heterogeneous array. For example, the assigning command may reference one or more rows (e.g., "1:4") of two or more columns from the heterogeneous array.

As further shown in FIG. 6, process 600 may include determining, based on the command, whether data types of the referenced columns of the heterogeneous array match data types of the data (block 630). For example, client device 210/TCE 240 may determine, based on the assigning command, whether the data types of the referenced columns of the heterogeneous array match the data types of the data provided in the assigning command. Client device 210/TCE 240 may analyze elements provided in each of the referenced columns to determine data types for each of the referenced columns. Client device 210/TCE 240 may also analyze elements provided in the data, of the assigning command, to determine data types associated with the data. Client device 210/TCE 240 may compare the data type for each referenced column with the data type for the corresponding data, of the assigning command, to determine whether the data types match. If the data types for the referenced columns and corresponding data, of the assigning command, match, client device 210/TCE 240 may determine that the referenced columns of the heterogeneous array and the corresponding data, of the assigning command, include the same data types. If the data types for the referenced columns and corresponding data, of the assigning command, do not match, client device 210/TCE 240 may determine that the referenced columns of the heterogeneous array and the corresponding data, of the assigning command, do not include the same data type.

Returning to FIG. 6, if the data types of the referenced columns of the heterogeneous array match the data types of the data of the assigning command (block 630—SAME DATA TYPES), process 600 may include replacing, based on the command, the information of the referenced multiple columns with the data, of the assigning command, to create a modified heterogeneous array (block 640). For example, if the data types for the referenced columns and corresponding data match, client device 210/TCE 240 may determine that the referenced columns of the heterogeneous array and the corresponding data include the same data types. Based on this determination, client device 210/TCE 240 may replace the information in the referenced columns of the heterogeneous array with the corresponding data, of the assigning command, to generate a modified heterogeneous array.

In some implementations, the assigning command may cause client device 210/TCE 240 to extract the referenced columns from the heterogeneous array. The assigning command may cause client device 210/TCE 240 to replace elements of the referenced columns with the corresponding data of the assigning command. Replacing the elements of the referenced columns with the corresponding data, of the assigning command, may create modified columns. The assigning command may cause client device 210/TCE 240 to return the modified columns to the heterogeneous array. Returning the modified columns to the heterogeneous array may generate the modified heterogeneous array. Other ways of replacing the information from the referenced columns of the heterogeneous array with the data of the assigning command may alternatively be used.

As further shown in FIG. 6, process 600 may include outputting the modified heterogeneous array (block 650). Client device 210/TCE 240 may provide the modified heterogeneous array for display to the user. In some implementations, client device 210 may store the modified heterogeneous array in memory (e.g., main memory 330, FIG. 3).

Returning to FIG. 6, if the data types of the referenced columns of the heterogeneous array do not match the data types of the data of the assigning command (block 630—DIFF. DATA TYPES), process 600 may include generating and/or outputting an error message based on the command (block 660). For example, if the data types for the referenced columns and corresponding data, of the assigning command, do not match, client device 210/TCE 240 may determine that the referenced columns of the heterogeneous array and the corresponding data, of the assigning command, are not of the same data type. Based on this determination, client device 210/TCE 240 may determine that the corresponding data, of the assigning command, cannot be used to replace the information in the referenced columns of the heterogeneous array. Thus, client device 210/TCE 240 may generate an error message that may be displayed to the user. In some implementations, the error message may indicate that it is impossible to replace the information in the referenced columns of the heterogeneous array with the data since the referenced columns and the data have different data types.

In some implementations, client device 210/TCE 240 may provide a suggestion, to the user, to facilitate replacing the information in the referenced columns of the heterogeneous array with the data. For example, client device 210/TCE 240 may identify the data type of each column of the heterogeneous array, referenced by the assigning command. Client device 210/TCE 240 may also identify the data types of the corresponding data, of the assigning command. Assume that the assigning command references particular corresponding data that does not match the data type of a referenced column. In this situation, client device 210/TCE 240 may identify other columns, of the heterogeneous array, that are of the same data type as the particular corresponding data. Client device 210/TCE 240 may provide a user interface, to the user, which allows the user to select one of the other identified columns, of the heterogeneous array, of the same data type, to replace the one column, referenced by the assigning command, of the different data type.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Example Utilization of a Heterogeneous Array and an Assigning Command

Figure 7A:
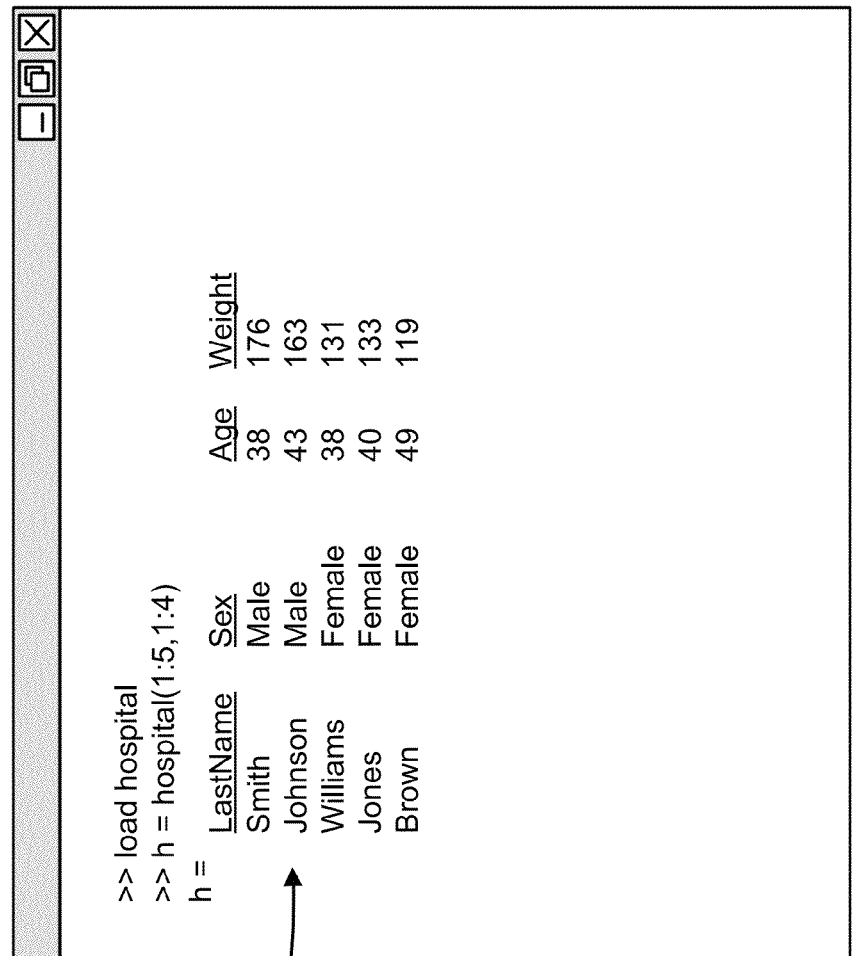
FIGS. 7A-7E are diagrams of an example of the process described above with respect to FIG. 6.

FIGS. 7A-7E are diagrams of an example 700 of the process described above with respect to FIG. 6. In the example 700, assume that client device 210/TCE 240 receives a heterogeneous array (h) 710 that includes multiple columns. The user may instruct client device 210 to load heterogeneous array 710 into TCE 240 using a command (e.g., a 'load' command), and client device 210 may load heterogeneous array 710 into TCE 240 based on the command. As shown in FIG. 7A, client device 210/TCE 240 may provide heterogeneous array 710 for display to the user, based on the command. In example 700 corresponding data, of the assigning command, assume that heterogeneous array 710 includes the elements of heterogeneous array 510 described above in connection with FIGS. 5A-5F.

Figure 7B:
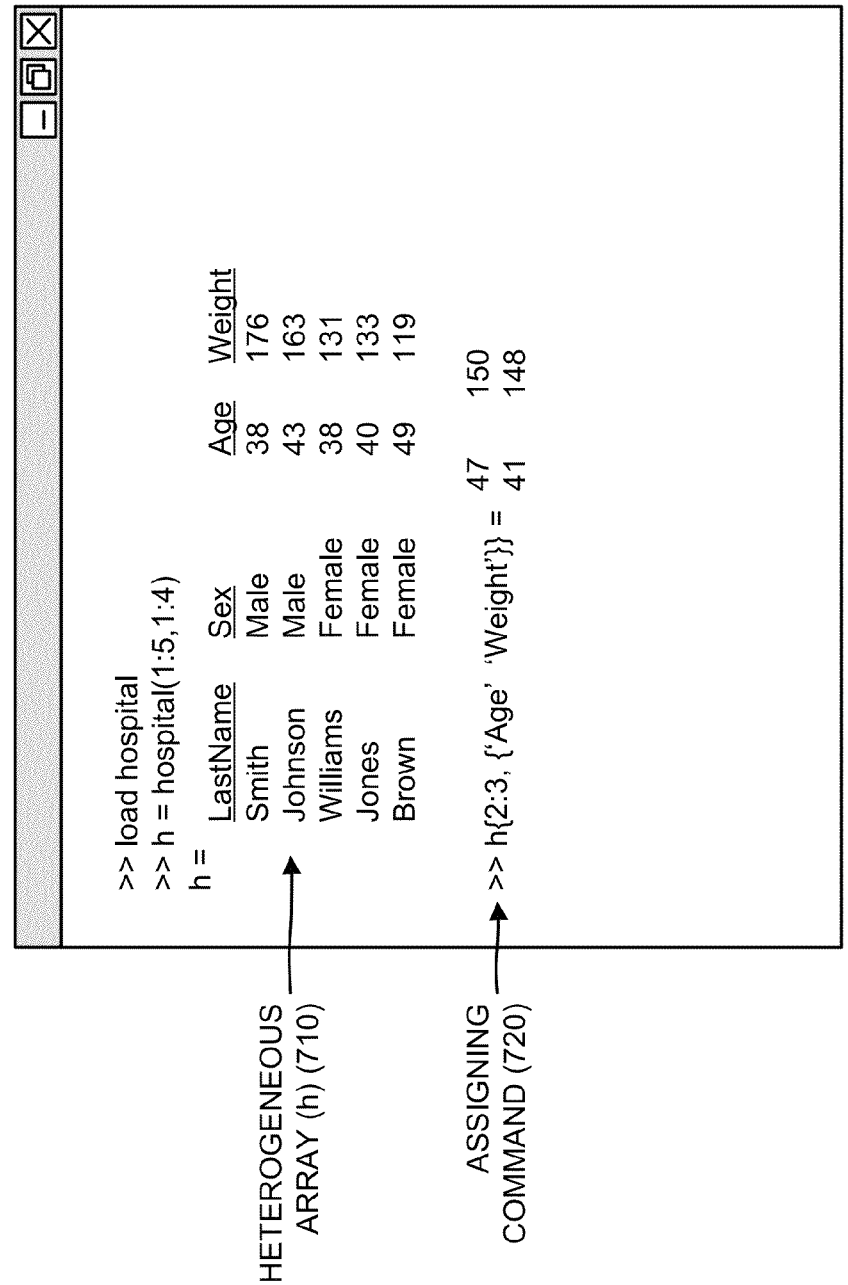

As shown in FIG. 7B, assume that client device 210/TCE 240 receives an assigning command 720 from the user of client device 210/TCE 240. For example, assume that the user enters assigning command 720 via a command line. Assigning command 720 may include syntax, such as, for example:

$$h\{2:3, \{'Age' \; 'Weight'\}\} = \begin{matrix} 47 & 150 \\ 41 & 148 \end{matrix}.$$

Assigning command 720 may be utilized by client device 210/TCE 240 to replace information in referenced columns of heterogeneous array 710 with corresponding data of assigning command 720. For example, assume that the user wishes to replace the age and weight of the second and third people listed in heterogeneous array 710 since the ages and weights of these people are incorrect. Assume that the age and weight of the second person is to be replaced with the data "47" and "150," respectively, and that the age and weight of the third person is to be replaced with the data "41" and "148," respectively. Assigning command 720 may attempt to replace information in heterogeneous array 710, with the data of assigning command 720, by referencing multiple columns and one or more rows of heterogeneous array 710. For example, assigning command 720 may reference rows "2" to "3" (e.g., "2:3") of the 'Age' and 'Weight' columns from heterogeneous array 710.

Client device 210/TCE 240 may determine, based on assigning command 720, whether the 'Age' and 'Weight' columns of heterogeneous array 710 include the same data types as the data of assigning command 720. Client device 210/TCE 240 may analyze elements provided in the 'Age' and 'Weight' columns of heterogeneous array 710 to determine data types of the 'Age' and 'Weight' columns. Client device 210/TCE 240 may analyze elements provided in the data, of assigning command 720, to determine data types associated with the data. Client device 210/TCE 240 may compare the determined data types to determine whether the data types match. In example 700, the determined data types of the 'Age' and 'Weight' columns and the data, of assigning command 720, are the same (i.e., numeric data types).

Figure 7C:
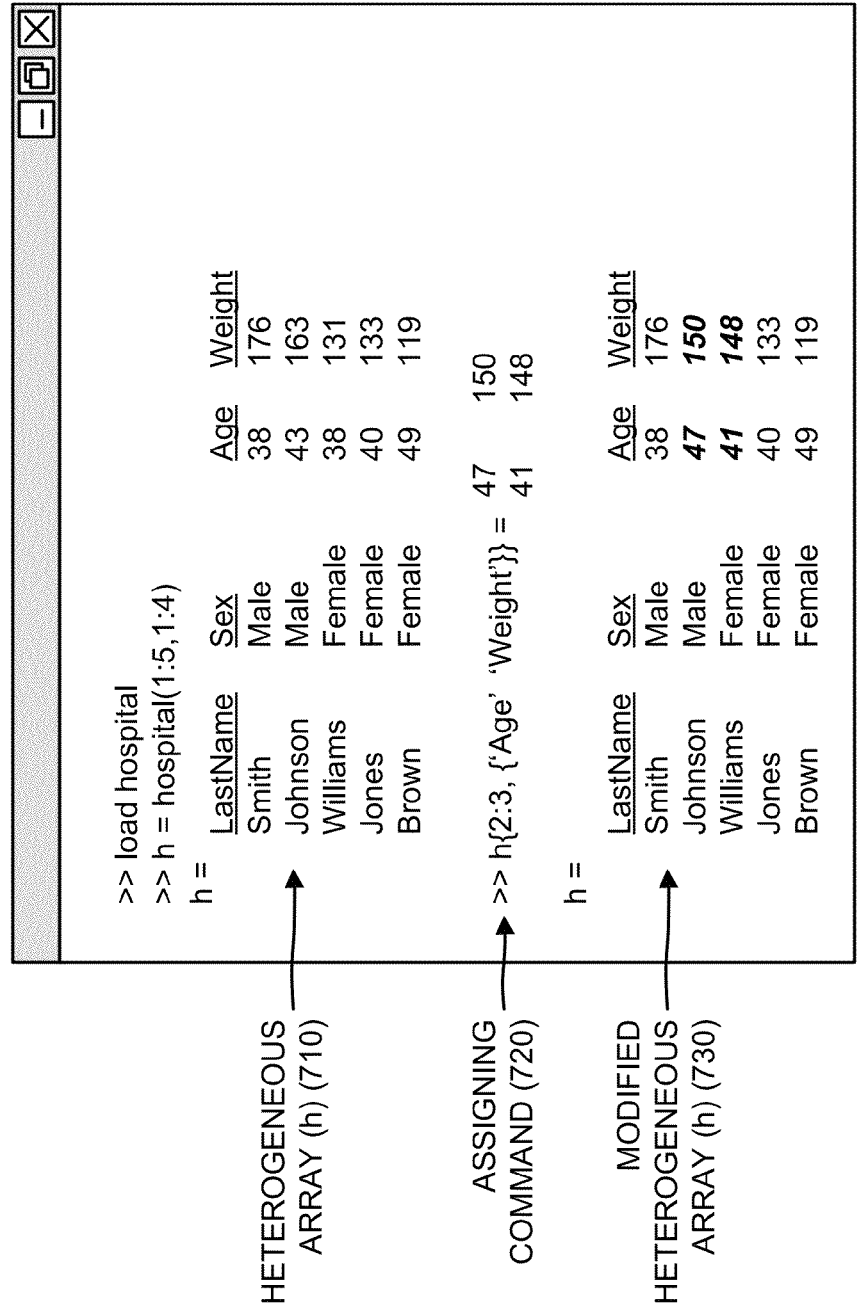

Since the determined data types match, assigning command 720 may cause client device 210/TCE 240 to replace the information in the referenced columns of heterogeneous array 710 with the corresponding data, of assigning command 720, to generate a modified heterogeneous array (h) 730 (FIG. 7C). Modified heterogeneous array 730 may include the elements of heterogeneous array 710, except that the age and weight of the second person is replaced with the data "47" and "150," respectively, and the age and weight of the third person is replaced with the data "41" and "148," respectively. As shown in FIG. 7C, client device 210/TCE 240 may cause modified homogeneous array 730 to be displayed to the user. In some implementations, client device 210 may store modified homogeneous array 730 in memory (e.g., main memory 330, FIG. 3). In some implementations, client device 210/TCE 240 may highlight (e.g., with different fonts, different colors, etc.) the corresponding data in modified heterogeneous array 730.

Figure 7D:
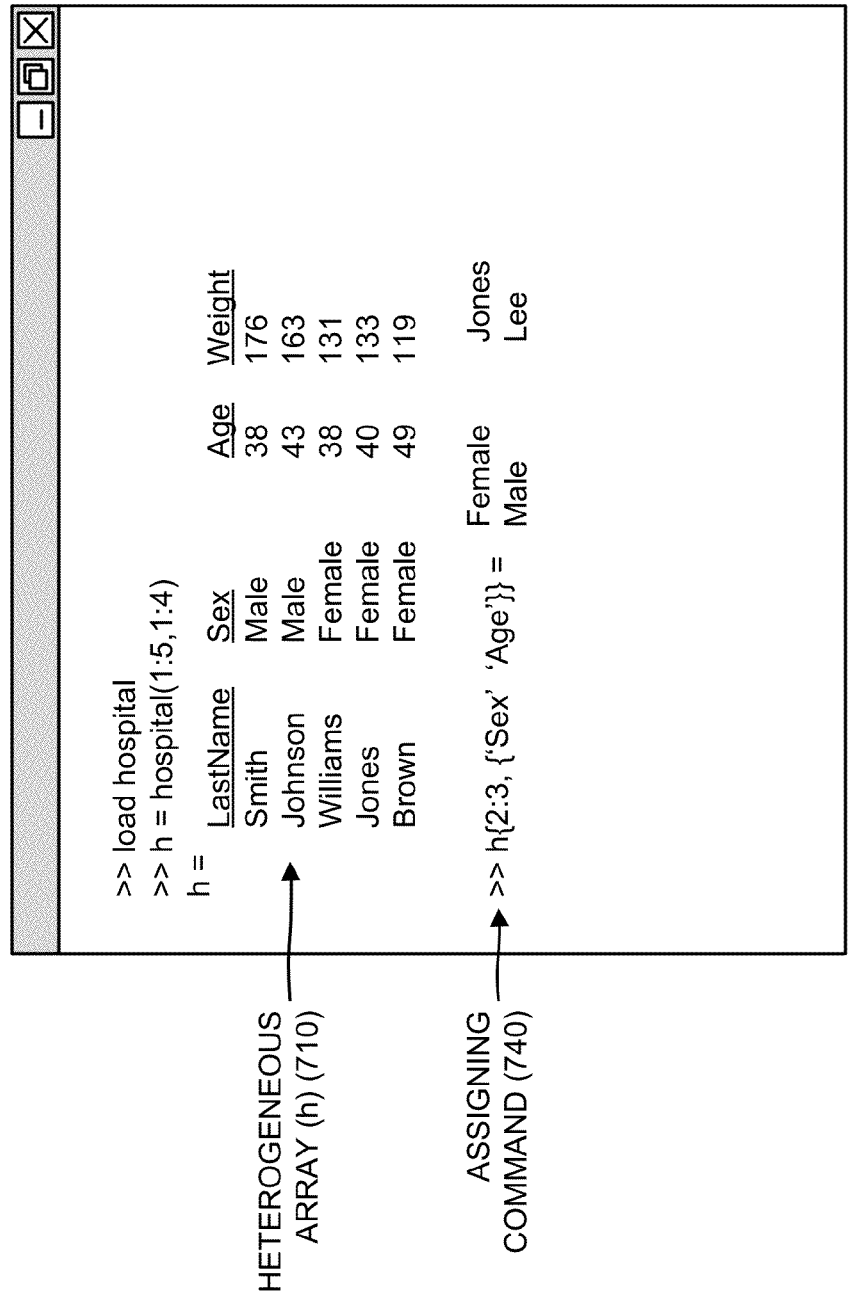

As shown in FIG. 7D, assume that the user inputs an assigning command 740 instead of assigning command 720 (FIG. 7B). Assigning command 740 may reference columns of heterogeneous array 710 that have different data types than data associated with assigning command 740. For example, assigning command 740 may reference the 'Sex' column (e.g., a textual data type) and the 'Age' column (e.g., a numeric data type) of heterogeneous array 710. However, the data (e.g., Mary and Bob) of assigning command 740 that corresponds to the 'Age' column may include a textual data type rather than a numeric data type. Thus, client device 210/TCE 240 may determine that assigning command 740 references columns of heterogeneous array 710 that have different data types than data associated with assigning command 740.

Figure 7E:
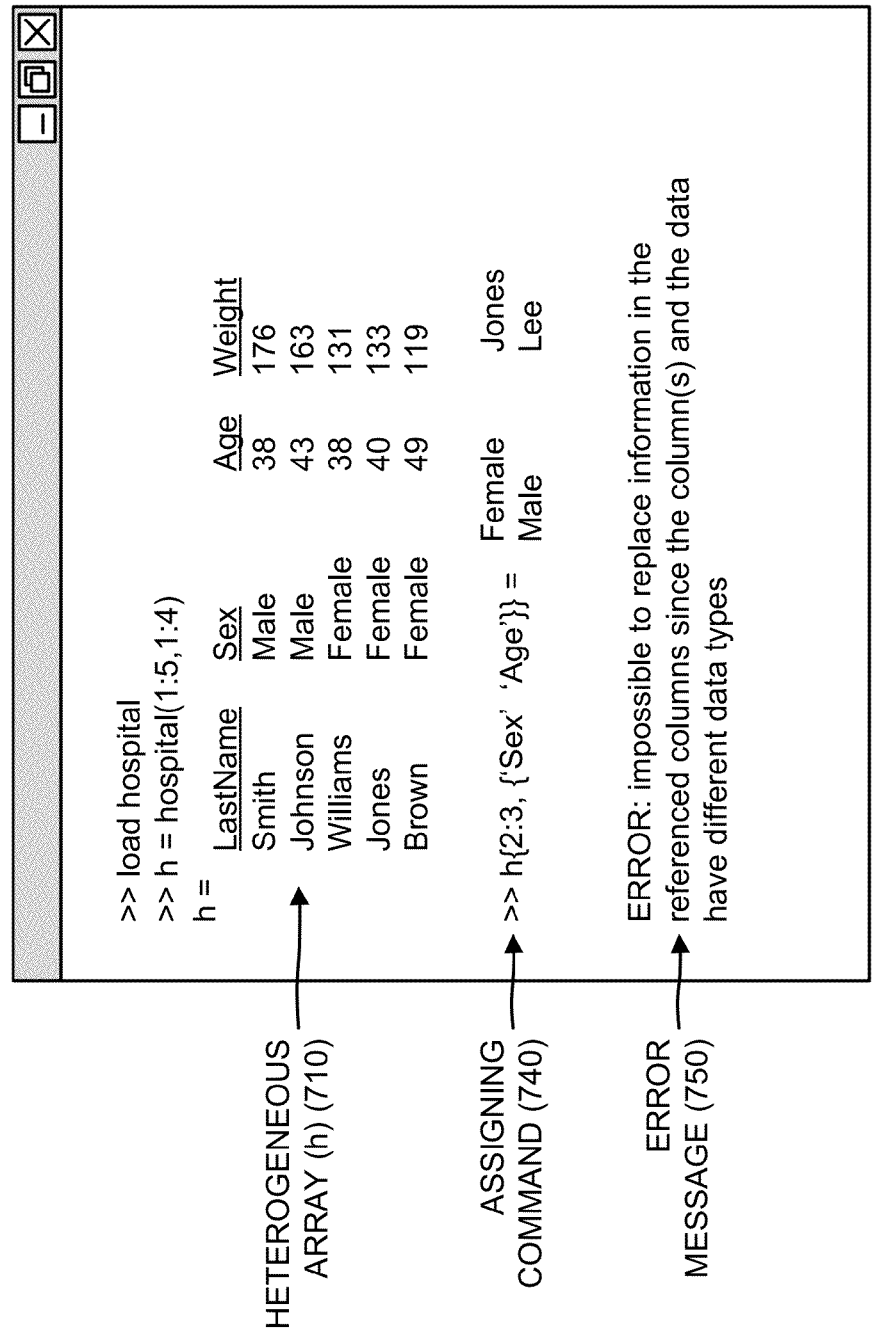

Based on this determination, client device 210/TCE 240 may determine that the corresponding data cannot be used to replace the information in the referenced columns of heterogeneous array 710. Thus, client device 210/TCE 240 may generate an error message 750 that may be displayed to the user, as shown in FIG. 7E. In some implementations, error message 750 may indicate that it is impossible to replace the information in the referenced columns of heterogeneous array 710 with the data, of assigning command 720, since the referenced columns and the data, of assigning command 720, have different data types.

In some implementations, client device 210/TCE 240 may display a suggestion to the user when error message 560 is generated. For example, client device 210/TCE 240 may suggest replacing the 'Age' column of heterogeneous array 510 with the 'LastName' column of heterogeneous array 510 since the 'LastName' column has a textual data type like the data (e.g., Mary and Bob) of assigning command 740.

CONCLUSION

Systems and/or methods described herein may provide an indexing command to extract homogeneous information from heterogeneous arrays, such as dataset arrays, and an assigning command to replace homogeneous information provided in the heterogeneous arrays. The homogeneous information may include multiple values (e.g., numeric data, non-numeric data, etc.) with the same data type or that can be converted to the same data type.

The foregoing description of implementations provides illustration and description, but is not intended to be exhaustive or to limit the implementations to the precise form disclosed. Modifications and variations are possible in light of the above teachings or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:
1. A method comprising:
receiving, in a technical computing environment (TCE), a heterogeneous array that includes columns and rows,
the receiving the heterogeneous array being performed by a device;
receiving a command for use in creating a homogeneous array from the heterogeneous array,
the command referencing multiple columns and one or more rows of the heterogeneous array,
the receiving the command being performed by the device;
determining that the referenced multiple columns of the heterogeneous array include a single data type or multiple data types that are convertible to a same data type,
the determining being performed by the device;
creating, based on the command and based on determining that the referenced multiple columns of the heterogeneous array include the single data type or the multiple data types that are convertible to the same data type, the homogeneous array from the heterogeneous array,
creating the homogeneous array from the heterogeneous array including extracting the referenced multiple columns and the referenced one or more rows from the heterogeneous array,
the homogeneous array including the referenced multiple columns and the referenced one or more rows of the heterogeneous array,
the TCE including an operation that is operable on the homogeneous array and that is not operable on the heterogeneous array,
the creating the homogeneous array being performed by the device; and outputting the homogeneous array for further processing,
the outputting the homogeneous array being performed by the device.

2. The method of claim 1, further comprising:
generating an error message based on determining that the referenced multiple columns of the heterogeneous array include a different data type.

3. The method of claim 1, where creating the homogeneous array comprises:
combining the extracted, referenced columns into a temporary homogeneous array; and
removing one or more unreferenced rows from the temporary homogeneous array to create the homogeneous array.

4. The method of claim 1, where the command includes a syntax of:
$h\{R_1:R_2, \{C_1 \ldots C_N\}\}$,
where h corresponds to the heterogeneous array, $R_1$ corresponds to a row of the heterogeneous array, $R_2$ corresponds to another row of the heterogeneous array, $C_1$ corresponds to a column of the heterogeneous array, and $C_N$ corresponds to another column of the heterogeneous array.

5. The method of claim 1, further comprising:
performing an operation on the homogeneous array to generate a modified homogeneous array; and
providing the modified homogeneous array in the referenced multiple columns of the heterogeneous array.

6. The method of claim 1, where a syntax of the command includes at least two row identifiers, that each identifies a respective row of the heterogeneous array, and a syntax character,
the syntax character indicating an instruction for at least one of:
extracting all consecutive rows, between the rows identified by the at least two row identifiers, from the heterogeneous array, or
extracting only the rows identified by the at least two row identifiers;
the method further comprising:
determining the referenced one or more rows of the heterogeneous array based on the syntax character.

7. The method of claim 1, further comprising:
performing the operation on the homogenous array to generate transformed data; and
replacing data at the referenced multiple columns and the referenced one or more rows of the heterogeneous array with the transformed data.

8. The method of claim 1, where extracting the referenced multiple columns and the referenced one or more rows from the heterogeneous array includes extracting a content located at the referenced multiple columns and the referenced one or more rows of the heterogeneous array.

9. A non-transitory computer-readable medium for storing instructions, the instructions comprising:
one or more instructions that, when executed by a processor of a device, cause the processor to:
receive, in a technical computing environment (TCE), a heterogeneous array that includes columns and rows,
receive a command to create a homogenous array from the heterogeneous array, the command referencing multiple columns and one or more rows of the heterogeneous array,
determine that the referenced multiple columns of the heterogeneous array include a single data type or multiple data types that are convertible to a same data type,
create, based on the command and based on determining that the referenced multiple columns of the heterogeneous array include the single data type or the multiple data types that are convertible to the same data type, the homogeneous array from the heterogeneous array,
creating the homogenous array from the heterogeneous array including extracting the referenced multiple columns and the referenced one or more rows from the heterogeneous array,
the homogeneous array including the referenced multiple columns and the referenced one or more rows of the heterogeneous array,
the TCE including an operation that is operable on the homogeneous array and that is not operable on the heterogeneous array, and
output the homogeneous array for further processing.

10. The non-transitory computer-readable medium of claim 9, further comprising:
one or more instructions that, when executed by the processor, cause the processor to:
generate an error message based on determining that the referenced multiple columns of the heterogeneous array include a different data type,
where the error message indicates that the referenced multiple columns cannot be combined due to the different data types.

11. The non-transitory computer-readable medium of claim 9, where the one or more instructions that cause the processor to create the homogeneous array comprise:
one or more instructions that, when executed by the processor, cause the processor to:
combine the extracted, referenced columns into a temporary homogeneous array, and
remove one or more unreferenced rows from the temporary homogeneous array to create the homogeneous array.

12. The non-transitory computer-readable medium of claim 9, where the command includes a syntax of:
$h\{R_1:R_2, \{C_1 \ldots C_N\}\}$,
where h corresponds to the heterogeneous array, $R_1$ corresponds to a row of the heterogeneous array, $R_2$ corresponds to another row of the heterogeneous array, $C_1$ corresponds to a column of the heterogeneous array, and $C_N$ corresponds to another column of the heterogeneous array.

13. The non-transitory computer-readable medium of claim 9, further comprising:
one or more instructions that, when executed by the processor, cause the processor to:
perform an operation on the homogeneous array to generate a modified homogeneous array, and
provide the modified homogeneous array in the referenced multiple columns of the heterogeneous array.

14. The non-transitory computer-readable medium of claim 9, where a syntax of the command includes at least two row identifiers, that each identifies a respective row of the heterogeneous array, and a syntax character,
the syntax character indicating an instruction for at least one of:
extracting all consecutive rows, between the rows identified by the at least two row identifiers, from the heterogeneous array, or
extracting only the rows identified by the at least two row identifiers;
the medium further comprising:
one or more instructions that, when executed by the processor, cause the processor to:
determine the referenced one or more rows of the heterogeneous array based on the syntax character.

15. The non-transitory computer-readable medium of claim 9, further comprising:
one or more instructions that, when executed by the processor, cause the processor to:
perform the operation on the homogenous array to generate transformed data; and
replace data at the referenced multiple columns and the referenced one or more rows of the heterogeneous array with the transformed data.

16. A device comprising:
one or more memories; and
one or more processors, connected to the one or more memories, to:
receive, in a technical computing environment (TCE), a heterogeneous array that includes columns and rows,
receive a command to create a homogeneous array from the heterogeneous array, the command referencing multiple columns and one or more rows of the heterogeneous array,
determine that the referenced multiple columns of the heterogeneous array include a single data type or multiple data types that are convertible to a same data type,
create, based on the command and based on determining that the referenced multiple columns of the heterogeneous array include the single data type or multiple data types that are convertible to the same data type, the homogeneous array from the heterogeneous array,
creating the homogenous array from the heterogeneous array including extracting the referenced multiple columns and the referenced one or more rows from the heterogeneous array,
the homogeneous array including the referenced multiple columns and the referenced one or more rows of the heterogeneous array,
the TCE including an operation that is operable on the homogeneous array and that is not operable on the heterogeneous array, and
output the homogeneous array for further processing.

17. The device of claim 16, where the one or more processors are further to:
generate an error message based on determining that the referenced multiple columns of the heterogeneous array include a different data type,
where the error message indicates that the referenced multiple columns cannot be combined due to the different data types.

18. The device of claim 16, where the one or more processors, when creating the homogeneous array, are to:
combine the extracted, referenced columns into a temporary homogeneous array, and
remove one or more unreferenced rows from the temporary homogeneous array to create the homogeneous array.

19. The device of claim 16, where the command includes a syntax of:
$h\{R_1:R_2, \{C_1 \ldots C_N\}\}$,
where h corresponds to the heterogeneous array, $R_1$ corresponds to a row of the heterogeneous array, $R_2$ corresponds to another row of the heterogeneous array, $C_1$ corresponds to a column of the heterogeneous array, and $C_N$ corresponds to another column of the heterogeneous array.

20. The device of claim 16, where the one or more processors are further to:
perform an operation on the homogeneous array to generate a modified homogeneous array, and
provide the modified homogeneous array in the referenced multiple columns of the heterogeneous array.

21. The device of claim 16, where the one or more processors are further to:
perform the operation on the homogenous array to generate transformed data; and
replace data at the referenced multiple columns and the referenced one or more rows of the heterogeneous array with the transformed data.

* * * * *